United States Patent
Song et al.

(10) Patent No.: US 11,588,341 B2
(45) Date of Patent: Feb. 21, 2023

(54) QUICK BATTERY CHARGING SYSTEM

(71) Applicant: LG CHEM, LTD., Seoul (KR)

(72) Inventors: Jun-Hyuk Song, Daejeon (KR);
Eun-Kyung Kim, Daejeon (KR);
Joo-Sung Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 704 days.

(21) Appl. No.: 16/491,152

(22) PCT Filed: Aug. 28, 2018

(86) PCT No.: PCT/KR2018/009929
§ 371 (c)(1),
(2) Date: Sep. 4, 2019

(87) PCT Pub. No.: WO2019/066269
PCT Pub. Date: Apr. 4, 2019

(65) Prior Publication Data
US 2020/0036193 A1 Jan. 30, 2020

(30) Foreign Application Priority Data
Sep. 26, 2017 (KR) .................. 10-2017-0124420

(51) Int. Cl.
*H02J 7/00* (2006.01)
*H01M 4/525* (2010.01)
(Continued)

(52) U.S. Cl.
CPC ............. *H02J 7/007* (2013.01); *H01M 4/525* (2013.01); *H01M 4/587* (2013.01);
(Continued)

(58) Field of Classification Search
CPC ...................................... H02J 7/007
(Continued)

(56) References Cited

U.S. PATENT DOCUMENTS

2003/0001581 A1  1/2003  Laig-Horstebrock et al.
2005/0233219 A1 10/2005  Gozdz et al.
(Continued)

FOREIGN PATENT DOCUMENTS

CN  103036243 A  4/2013
CN  104364669 A  2/2015
(Continued)

OTHER PUBLICATIONS

International Search Report issued in corresponding International Application No. PCT/KR2018/009929, dated Feb. 8, 2019.
(Continued)

*Primary Examiner* — Eric D Lee
(74) *Attorney, Agent, or Firm* — Morgan, Lewis & Bockius LLP (57) ABSTRACT

The present disclosure discloses a quick battery charging system including a lithium secondary battery having a negative electrode porosity of 25 to 35% and a negative electrode loading amount of $x_0$. The system includes a storage unit which stores a lookup table for mapping first coefficient information of an upper bound condition associated with a C-rate of a charge current represented by a quadratic function and information associated with the negative electrode loading amount ($x_0$). The system includes a charging control apparatus which reads the information associated with the negative electrode loading amount ($x_0$) from the storage unit, determines the first coefficient information of the quadratic function representing the upper bound condition from the lookup table, determines the C-rate range of the charge current using the first coefficient information, and supplies the charge current satisfying the determined C-rate range to the lithium secondary battery.

20 Claims, 5 Drawing Sheets

(51) Int. Cl.
  *H01M 4/587* (2010.01)
  *H01M 10/0525* (2010.01)
  *H01M 10/0569* (2010.01)
  *H01M 10/46* (2006.01)
  *H01M 4/02* (2006.01)

(52) U.S. Cl.
  CPC .............. *H01M 10/0525* (2013.01); *H01M 10/0569* (2013.01); *H01M 10/46* (2013.01); *H01M 2004/021* (2013.01); *H01M 2300/004* (2013.01)

(58) Field of Classification Search
  USPC ......................................................... 320/137
  See application file for complete search history.

(56) References Cited

U.S. PATENT DOCUMENTS

| | | |
|---|---|---|
| 2008/0238362 A1 | 10/2008 | Pinnell et al. |
| 2012/0169129 A1 | 7/2012 | Kim et al. |
| 2012/0169297 A1 | 7/2012 | Schaefer et al. |
| 2013/0088900 A1 | 4/2013 | Park |
| 2013/0335031 A1 | 12/2013 | Joe et al. |
| 2013/0337301 A1 | 12/2013 | Joe et al. |
| 2014/0306665 A1 | 10/2014 | Kim et al. |
| 2015/0084639 A1 | 3/2015 | Joe |
| 2015/0100260 A1 | 4/2015 | Joe et al. |
| 2015/0160300 A1 | 6/2015 | Ishii et al. |
| 2015/0287984 A1 | 10/2015 | Kong et al. |
| 2015/0340732 A1 | 11/2015 | Kim et al. |
| 2016/0214500 A1 | 7/2016 | Kim et al. |
| 2017/0033389 A1 | 2/2017 | Chiang et al. |
| 2017/0092937 A1 | 3/2017 | Oyama et al. |
| 2017/0229729 A1 | 8/2017 | Elliott et al. |

FOREIGN PATENT DOCUMENTS

| | | |
|---|---|---|
| CN | 104541175 A | 4/2015 |
| CN | 104781964 A | 7/2015 |
| CN | 105823988 A | 8/2016 |
| CN | 106558699 A | 4/2017 |
| CN | 106797043 A | 5/2017 |
| JP | 3653913 B2 * | 6/2005 |
| JP | 2014-533877 A | 12/2014 |
| JP | 2015-201994 A | 11/2015 |
| KR | 10-2012-0028000 A | 3/2012 |
| KR | 10-2015-0134163 A | 12/2015 |
| KR | 10-2016-0079508 A | 7/2016 |
| KR | 10-2017-0038296 A | 4/2017 |
| KR | 10-2017-0063271 A | 6/2017 |
| WO | 2006/025662 A1 | 3/2006 |

OTHER PUBLICATIONS

Extended European Search Report from the European Patent Office dated Feb. 26, 2020 in a corresponding European patent application No. 18860516.6.

Honghe Zheng et al. "A comprehensive understanding of electrode thickness effects on the electrochemical performances of Li-ion battery cathodes," Electrochimica Acta 71(2012), pp. 258-265.

Jing-Shan Do et al."Amperometric nitric oxide gas sensor: preparation of Au/SPE and sensing behavior," Sensors and Actuators, B 67 (2000), pp. 209-216.

* cited by examiner

QUICK BATTERY CHARGING SYSTEM

TECHNICAL FIELD

The present disclosure relates to a fast charging system for a lithium secondary battery, and more particularly, a fast charging system for a lithium secondary battery designed to obtain the maximum energy density and the maximum fast charging performance.

The present application claims priority to Korean Patent Application No. 10-2017-0124420 filed in the Republic of Korea on Sep. 26, 2017, the disclosures of which are incorporated herein by reference.

BACKGROUND ART

Lithium secondary batteries are rapidly extending their use to the applications including not only mobile devices such as mobile phones, laptop computers, smart phones and smart pads but also electricity-powered vehicles (EV, HEV, PHEV) or high capacity energy storage systems (ESSs).

In applying lithium secondary batteries for vehicles and information communication devices, fast charging is regarded as important technology.

The greatest problem occurring during fast charging is lithium dendrite formed (deposited) on the negative electrode surface. Here, the negative electrode material is typically graphite. The lithium dendrite clogs the surface of the negative electrode and hampers the movement of lithium during charging and discharging. Additionally, the lithium dendrite causes side reactions with an electrolyte solution, and adversely affects the life performance of the lithium secondary battery.

The negative electrode materials advantageous for fast charging include hard carbon, soft carbon and graphene. These materials are regarded as a material that can replace graphite. However, because the materials have high irreversible capacity and low potential on the basis of lithium metal, they reduce the mean voltage of the lithium secondary battery. When the mean voltage reduces, the lithium secondary battery reduces in energy density.

Accordingly, there is a limitation to improvement in the fast charging performance of the lithium secondary battery only by tuning the negative electrode material. That is, appropriate selection of the negative electrode material may reduce lithium dendrite deposition during fast charging, but energy density reduces. To overcome this limitation, there is a need for appropriate design of batteries that exhibit fast charging performance while preventing the energy density reduction of the lithium secondary battery.

DISCLOSURE

Technical Problem

The present disclosure is designed under the background of the related art as described above, and the present disclosure is directed to providing a system that designs a negative electrode loading amount to ensure high energy density while using a graphite-based material as a negative electrode material as usual and charges a lithium secondary battery rapidly under the optimized condition according to the designed negative electrode loading condition.

Technical Solution

To achieve the above-described object, a quick battery charging system according to the present disclosure includes a lithium secondary battery having a negative electrode porosity of 25 to 35% and a negative electrode loading amount of $x_0$, a storage unit which stores a lookup table for mapping first coefficient information of an upper bound condition associated with a C-rate of a charge current represented by a quadratic function and information associated with the negative electrode loading amount ($x_0$), and a charging control apparatus which reads the information associated with the negative electrode loading amount ($x_0$) from the storage unit, determines the first coefficient information of the quadratic function representing the upper bound condition from the lookup table, determines the C-rate range of the charge current using the first coefficient information, and supplies the charge current satisfying the determined C-rate range to the lithium secondary battery.

According to an aspect, the lookup table may further include data for mapping second coefficient information of a lower bound condition associated with a C-rate of a charge current represented by a quadratic function, and the charging control apparatus may be configured to read the information associated with the negative electrode loading amount ($x_0$) from the storage unit, determine the first coefficient information of the quadratic function representing the upper bound condition and the second coefficient information of the quadratic function representing the lower bound condition from the lookup table, determine the C-rate range of the charge current using the determined first coefficient information and second coefficient information, and supply the charge current satisfying the determined C-rate range to the lithium secondary battery.

Preferably, the lithium secondary battery may include lithium metal oxide and graphite as a positive electrode material and a negative electrode material, and the quadratic function corresponding to the upper bound condition may be $26-0.16x+0.00027x^2$. Additionally, the quadratic function corresponding to the lower bound condition may be $15-0.1x+0.00018x^2$.

According to another aspect, the lookup table may further include data for mapping the first coefficient information of the quadratic function corresponding to the upper bound condition according to the information associated with the type of the negative electrode material and the positive electrode material of the lithium secondary battery, the storage unit may further include type information associated with the positive electrode material and the negative electrode material of the lithium secondary battery, and the charging control apparatus may be configured to, when charging of the lithium secondary battery starts, identify the type information associated with the positive electrode material and the negative electrode material of the lithium secondary battery from the storage unit, map the first coefficient information of the quadratic function corresponding to the upper bound condition corresponding to the identified type information of the positive electrode material and the negative electrode material, determine the C-rate range of the charge current using the mapped first coefficient information and the information associated with the negative electrode loading amount ($x_0$), and supply the charge current satisfying the determined C-rate range to the lithium secondary battery.

According to still another aspect, the lookup table may include data for mapping the first coefficient information of the quadratic function corresponding to the upper bound condition and the second coefficient information of the quadratic function corresponding to the lower bound condition according to the information associated with the type of the negative electrode material and positive electrode material of the lithium secondary battery, the storage unit may further include type information associated with the positive electrode material and the negative electrode material of the lithium secondary battery, and the charging control apparatus may be configured to, when charging of the lithium secondary battery starts, identify the type information associated with the positive electrode material and the negative electrode material of the lithium secondary battery from the storage unit, map the first coefficient information of the quadratic function corresponding to the upper bound condition and the second coefficient information of the quadratic function corresponding to the lower bound condition corresponding to the identified type information of the positive electrode material and the negative electrode material, determine the C-rate range of the charge current using the mapped first coefficient information and second coefficient information and the information associated with the negative electrode loading amount ($x_0$), and supply the charge current satisfying the determined C-rate range to the lithium secondary battery.

Advantageous Effects

According to the present disclosure, there is an advantage that it is possible to design a negative electrode loading amount of a lithium secondary battery that satisfies customers' appropriate fast charging performance with ensuring high energy density using a graphite-based material as usual, and charge the lithium secondary battery rapidly under the optimal condition.

BRIEF DESCRIPTION OF THE DRAWINGS

The accompanying drawings illustrate a preferred embodiment of the present disclosure, and together with the following detailed description, serve to provide a further understanding of the technical aspects of the present disclosure, and thus the present disclosure should not be construed as being limited to the drawings.

MODE FOR CARRYING OUT THE INVENTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just a preferred embodiment of the present disclosure, but not intended to fully describe the technical aspects of the present disclosure, so it should be understood that a variety of other equivalents and modifications could be made thereto at the time when the invention was made.

In the embodiments as described below, a lithium secondary battery is referred collectively to as a secondary battery in which electrochemical reactions occur in a positive electrode and a negative electrode by the action of a lithium ion as a working ion during charging and discharging.

Meanwhile, even if the name of the secondary battery is subject to change depending on the type of an electrolyte or a separator used in the lithium secondary battery, the type of a packaging material used to package the lithium secondary battery and the internal or external structure of the lithium secondary battery, it should be interpreted that the category of the lithium secondary battery includes any secondary battery using a lithium ion that acts as a working ion.

In addition to the lithium secondary battery, the present disclosure may be applied to any other secondary battery. Accordingly, even though the working ion is not a lithium ion, it should be interpreted that the scope of the present disclosure covers any secondary battery to which the technical idea of the present disclosure may be applied irrespective of the type.

In the present disclosure, the lithium secondary battery includes an electrode assembly and a packaging material that packages it. The electrode assembly has a stack structure of unit cells, each including positive electrode/separator/negative electrode. The electrode assembly has a positive electrode terminal and a negative electrode terminal, and the positive electrode terminal and the negative electrode terminal are exposed to the outside through the packaging material.

According to an aspect, the positive electrode includes a metal current collector and a positive electrode material coating layer coated on at least one surface of the metal current collector.

The metal current collector is made of a material having chemical stability and high conductivity. For example, the metal current collector may be made of aluminum, stainless steel, nickel, titanium, and sintered carbon. Preferably, the metal current collector is made of aluminum.

According to an aspect, the positive electrode material coating layer includes, as a positive electrode active material, lithium metal oxide represented by the general chemical formula $A[A_xM_y]O_{2+z}$ (A includes at least one element of Li, Na and K; M includes at least one element selected from Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; the chemical stoichiometric coefficients of the elements included in x, y and z are selected such that the compound maintains electrical neutrality).

Preferably, in addition to the positive electrode material, the positive electrode material coating layer may further include an additive such as a conductive agent and a binder.

The conductive agent is not limited to a particular type and includes any type of material that may improve the electrical conductivity of the mixed positive electrode material, and non-limiting examples may include various conductive carbon materials such as graphite, carbon black, acetylene black, Ketjen black, super-P, and carbon nanotubes.

The binder is not limited to a particular type and includes any material that allows tight mechanical bonds between the particles of the mixed positive electrode material and tight interfacial bonds between the mixed positive electrode material and the metal current collector. Non-limiting examples of the binder may include various types of polymers such as PVDF-co-HFP, polyvinylidenefluoride, polyacrylonitrile and polymethylmethacrylate.

In an embodiment, the negative electrode may include a thin plate-shaped metal current collector made of a conductive material, and a negative electrode material coating layer containing a negative electrode active material, coated on at least one surface of the metal current collector.

The metal current collector is made of a material having chemical stability and high conductivity. For example, the metal current collector may be made of copper, aluminum, stainless steel, nickel, titanium, and sintered carbon. Preferably, the metal current collector is made of copper.

Preferably, the negative electrode material coating layer may include a graphite-based material as the negative electrode material. The graphite-based material may be artificial graphite, natural graphite or their mixtures.

In addition to the negative electrode material, the negative electrode material coating layer may further include an additive such as a conductive agent and a binder. The conductive agent and the binder may include materials that may be used as the conductive agent and the binder included in the positive electrode material coating layer.

The separator is not limited to a particular type and includes any separator that electrically separates the positive electrode from the negative electrode and has a pore structure for mediating the movement of the working ion.

For example, the separator may include a porous polymer film, for example, a porous polymer film made of polyolefin-based polymer such as ethylene homopolymer, propylene homopolymer, ethylene/butene copolymer, ethylene/hexene copolymer and ethylene/methacrylate copolymer, used singly or in stack. As another example, the separator may include a typical porous non-woven fabric, for example, a non-woven fabric made of high melting point glass fibers and polyethylene terephthalate fibers.

Meanwhile, the separator may include a coating layer of inorganic particles on at least one surface thereof. Additionally, the separator itself may be formed of a coating layer of inorganic particles. The particles that form the coating layer may be bound to the binder, forming interstitial volumes between adjacent particles. This structure is disclosed by WO2006/025662, and the PCT publication may be incorporated as a part of the specification. The inorganic particles may include inorganic matters having the dielectric constant of 5 or more. Non-limiting examples of the inorganic particles may include at least one material selected from the group consisting of $Pb(Zr, Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, $MgO$, $CaO$, $ZnO$ and $Y_2O_3$.

The lithium secondary battery may further include an electrolyte including a working ion. The electrolyte is not limited to a particular type and includes any electrolyte that includes a working ion and may cause electrochemical oxidation or reduction reactions to the positive electrode and the negative electrode by the mediation of the working ion.

Non-limiting examples of the electrolyte may include a salt with the structure of $A^+B^-$. Here, the $A^+$ includes an alkali metal cation such as $Li^+$, $Na^+$, $K^+$ or their combination. Additionally, the $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF^{2-}$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may be dissolved in an organic solvent. The organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone or their mixtures.

In a preferred embodiment, the viscosity of the electrolyte is 2-5 cP (centi-poise), and the concentration of the lithium salt is 0.8-1.4M. The viscosity is a value measured using Brookfield viscosity measurement device VISCOMETER DV2TLV.

The electrode assembly includes unit cells having a stack structure of at least positive electrode/separator/negative electrode. The unit cell may have various structures known in the art, and for example, the unit cell may have a bi-cell structure having the outermost electrodes of the same polarity or a full-cell structure having the outermost electrodes of different polarities. The bi-cell may have, for example, a structure of positive electrode/separator/negative electrode/separator/positive electrode. The full-cell may have, for example, a structure of positive electrode/separator/negative electrode/separator/positive electrode/separator/negative electrode.

The electrode assembly may have various structures known in the art, and for example, the electrode assembly may have a simple stack structure formed by repeatedly stacking up the unit cells and the separation films. Additionally, as another example, the electrode assembly may have a stack folding structure formed by arranging the unit cells on the separation film at a predetermined interval and rolling the separation film in a predetermined direction together with the unit cells. Additionally, as still another example, the electrode assembly may have a jelly roll structure formed by placing the unit cells manufactured in the shape of a sheet extending in one direction on the separation film and rolling the unit cells and the separation film into the shape of a roll.

In an embodiment, the lithium secondary battery may further include the packaging material to hermetically receive the electrode assembly together with the electrolyte. When the electrode assembly is hermetically received in the packaging material, the positive electrode and negative electrode may be respectively joined to the positive electrode terminal and the negative electrode terminal, and the positive electrode terminal and the negative electrode terminal may be drawn out of the packaging material. In some cases, when the packaging material serves as the electrode terminal, the packaging material may replace any one of the positive electrode terminal and the negative electrode terminal. For example, when the negative electrode is electrically connected to the inner surface of the packaging material, the outer surface of the packaging material may act as the negative electrode terminal. The packaging material is not limited to a particular type and includes any material having chemical safety, and non-limiting examples may include metals, polymers and flexible pouch films. The flexible pouch film may be typically an aluminum pouch film having a stack structure of a heat-weldable layer, an aluminum layer and an outer protective layer.

The shape of the lithium secondary battery is determined by the structure of the packaging material. The structure of the packaging material may include those known in the art, and there is no particular limitation on the shape according to the purpose of the battery. Non-limiting examples of the shape of the packaging material may include cylindrical, prismatic, pouch-type and coin-type structures using a can.

In the present disclosure, when the positive electrode material and the negative electrode material of the lithium secondary battery are $LiCoO_2$ and artificial graphite, the charge current C-rate of the lithium secondary battery and the negative electrode loading amount of the lithium secondary battery may be designed to satisfy the following conditional equation.

Of course, it is obvious that when there is a change in the type of the positive electrode material and the negative electrode material of the lithium secondary battery, the coefficient of the quadratic function may change.

$$c_1 - b_1 x + a_1 x^2 < y < c_2 - b_2 x + a_2 x^2 \quad \text{[Conditional equation]}$$

In the above conditional equation, $c_2 > c_1$, $b_2 > b_1$ and $a_2 > a_1$.

In a preferred embodiment, when the positive electrode material and the negative electrode material included in the lithium secondary battery are respectively $LiCoO_2$ and graphite, a specific example of the above conditional equation is as follows.

$$15 - 0.1x + 0.00018x^2 < y < 26 - 0.16x + 0.00027x^2 \quad \text{[Conditional equation]}$$

In the above conditional equations, y is the C-rate of the charge current supplied to the lithium secondary battery, and x is the negative electrode loading amount. The negative electrode loading amount is defined as the weight of the negative electrode material included in the negative electrode area of 25 cm².

The coefficient determination of the quadratic functions corresponding to the upper bound condition and the lower bound condition of the preferred embodiment is described through a specific example. Here, coefficients $a_2$, $b_2$ and $c_2$ of the quadratic function corresponding to the upper bound condition are referred to as a first coefficient, and coefficients $a_1$, $b_1$ and $c_1$ of the quadratic function corresponding to the lower bound condition are referred to as a second coefficient.

First, lithium secondary battery samples are manufactured under various design conditions as shown in the following Table 1.

TABLE 1

| | Loading amount (mg/25 cm²) | Porosity (%) | Energy density (Wh/L) | C-rate | Cycling performance |
|---|---|---|---|---|---|
| Example 1-1 | 154 | 26 | 650 | 0.5 | ◯ |
| Example 1-2 | 154 | 28 | 630 | 1.0 | ◯ |
| Example 1-3 | 154 | 30 | 610 | 1.5 | ◯ |
| Example 1-4 | 154 | 32 | 595 | 3.0 | ◯ |
| Example 1-5 | 154 | 34 | 580 | 6.0 | ◯ |
| Example 2-1 | 200 | 25 | 690 | 0.5 | ◯ |
| Example 2-2 | 200 | 27 | 670 | 0.7 | ◯ |
| Example 2-3 | 200 | 29 | 650 | 1.0 | ◯ |
| Example 2-4 | 200 | 31 | 630 | 1.3 | ◯ |
| Example 2-5 | 200 | 33 | 610 | 2.0 | ◯ |
| Example 2-6 | 200 | 35 | 600 | 3.0 | X |
| Example 3-1 | 240 | 25 | 740 | 0.5 | ◯ |
| Example 3-2 | 240 | 27 | 715 | 0.7 | ◯ |
| Example 3-3 | 240 | 29 | 690 | 1.0 | ◯ |
| Example 3-4 | 240 | 31 | 675 | 1.2 | ◯ |
| Example 3-5 | 240 | 33 | 650 | 1.5 | ◯ |
| Example 3-6 | 240 | 34 | 630 | 2.0 | X |
| Example 3-7 | 240 | 35 | 610 | 3.0 | X |
| Example 4-1 | 275 | 25 | 760 | 0.5 | ◯ |
| Example 4-2 | 275 | 27 | 740 | 0.7 | ◯ |
| Example 4-3 | 275 | 29 | 720 | 1.0 | ◯ |
| Example 4-4 | 275 | 31 | 690 | 1.3 | ◯ |
| Example 4-5 | 275 | 33 | 665 | 1.5 | X |
| Example 4-6 | 275 | 35 | 640 | 2.0 | X |
| Example 5-1 | 285 | 25 | 770 | 0.5 | ◯ |
| Example 5-2 | 285 | 27 | 745 | 0.8 | ◯ |
| Example 5-3 | 285 | 29 | 720 | 1.0 | ◯ |
| Example 5-4 | 285 | 31 | 695 | 1.2 | X |
| Example 5-5 | 285 | 33 | 660 | 1.5 | X |
| Example 5-6 | 285 | 35 | 640 | 2.0 | X |
| Example 6-1 | 300 | 25 | 780 | 0.5 | ◯ |
| Example 6-2 | 300 | 30 | 740 | 0.7 | ◯ |
| Example 6-3 | 300 | 35 | 700 | 1.0 | X |

Each of the lithium secondary batteries according to examples 1 to 6 includes $LiCoO_2$ and artificial graphite as a positive electrode material and a negative electrode material. Additionally, an electrolyte includes a solvent of ethylenecarbonate (EC)/ethylmethylcarbonate (EMC)/dimethylcarbonate (DMC) mixed at the volume ratio of 3:3:4 with an addition of 1.0 M of lithium salt LiF. In manufacturing the samples, the porosity of the negative electrode variously changes for each negative electrode loading amount of the lithium secondary battery. The determination of the energy density of the lithium secondary battery relies on the porosity of the negative electrode. The porosity is determined by measuring the volume of pores per unit volume of the negative electrode. In detail, the density of the active material layer, the thickness of the electrode after rolling, and the electrode loading weight were calculated, and the porosity was obtained through mathematical calculation.

To collect data for determining the first coefficient and the second coefficient, charge cycle tests are repeatedly performed under a predefined C-rate condition applied for each example. Additionally, success/failure is determined by evaluating the life performance for each example. The success standard of life performance is the capacity retention rate of 80% on the basis of 300 cycles. Accordingly, the capacity retention rate of 80% or more is a success, and the capacity retention rate of less than 80% is a failure.

Figure 1:
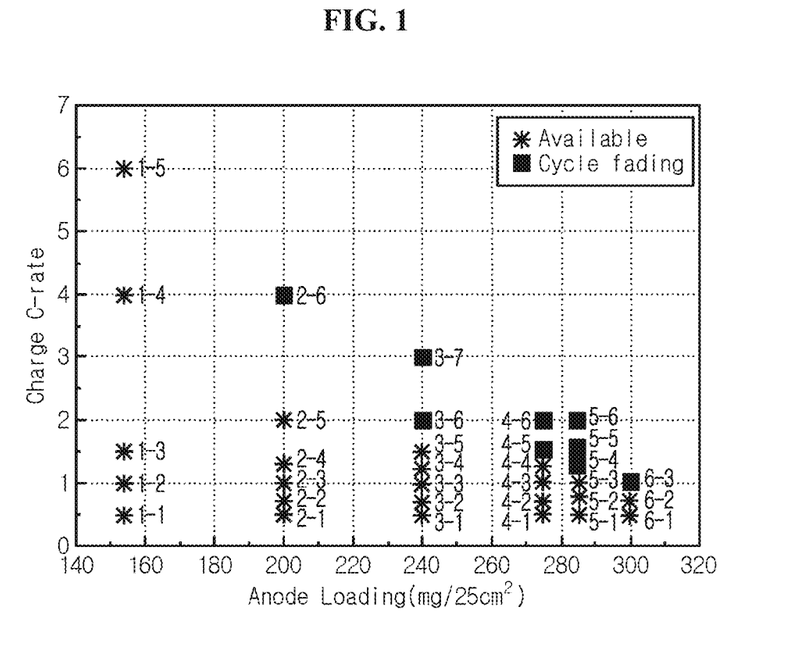
FIG. 1 is a graph showing the results of life performance evaluation performed on a plurality of sample batteries to design the C-rate range of the fast charge current according to a negative electrode loading amount of a lithium secondary battery.

FIG. 1 is a graph showing the life performance evaluation results obtained from the charge cycle tests for each example in the above Table 1. In the graph, the ■ mark indicates an example evaluated as having failed the life performance, and the * mark indicates an example evaluated as having succeeded the life performance. In indicating each mark, the negative electrode loading amount of each example is represented as the x coordinate, and the C-rate of the charge current is represented as they coordinate.

Figure 2:
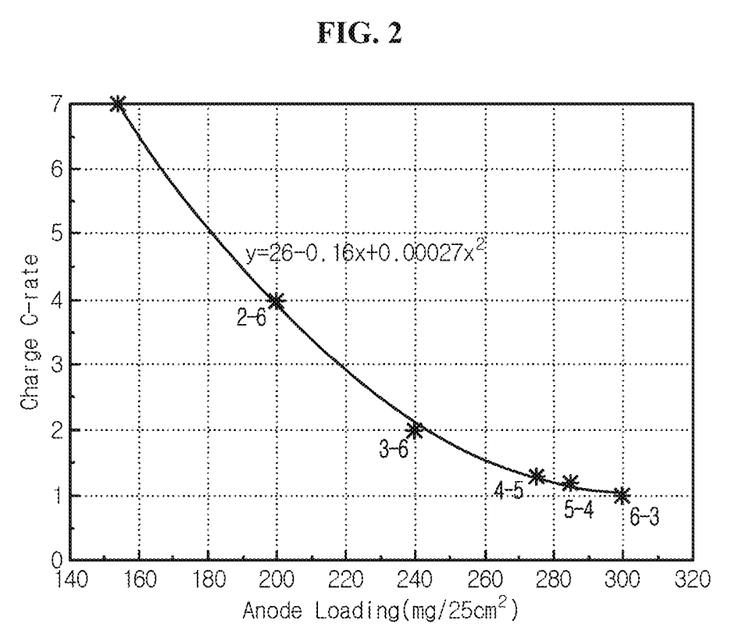
FIG. 2 is a graph showing the fitting result of a quadratic function corresponding to the upper bound condition for the C-rate of the charge current.

FIG. 2 shows that example 2-6, example 3-6, example 4-5, example 5-4 and example 6-3 are selected from examples determined to have failed the life performance evaluation shown in FIG. 1 and coordinates marks corresponding to each example are indicated.

The five coordinates correspond to examples exhibiting the lowest C-rate of the charge current supplied to the lithium secondary battery among examples determined to have failed the life performance.

The five coordinates shown in FIG. 2 may be fitted to the quadratic function $y=26-0.16x+0.00027x^2$, and the fitted corresponding function corresponds to the upper bound condition of the conditional equation, and the coefficients 26, −0.16 and 0.00027 correspond to the first coefficient information.

The examples positioned at the lower part in the graph showing the quadratic function corresponding to the upper bound condition have the porosity of less than 35% and the energy density of 600 Wh/L or more in common. Undesirably, when the porosity is higher than 35%, the energy density is less than 600 Wh/L.

Meanwhile, the lower bound condition of the above conditional equation may be arbitrarily set, but the present disclosure selects the porosity of 25% or more and the energy density not exceeding 750 Wh/L.

Figure 3:
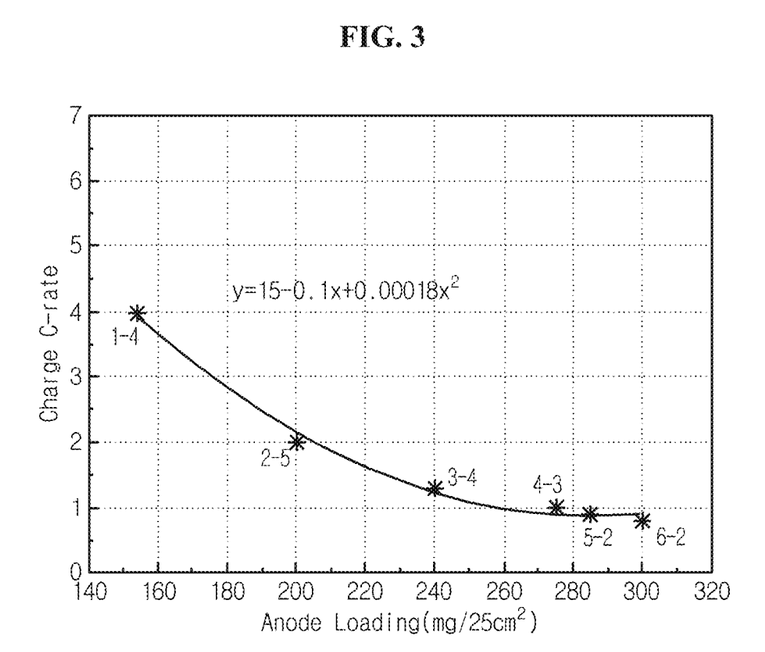
FIG. 3 is a graph showing the fitting result of a quadratic function corresponding to the lower bound condition for the C-rate of the charge current.

The examples satisfying this condition are example 1-4, example 2-5, example 3-4, example 4-3, example 5-2 and example 6-2, and mark coordinates corresponding to these examples are indicated on a graph as shown in FIG. 3.

The six coordinates shown in FIG. 3 may be fitted to the quadratic function $15-0.1x+0.00018x^2$, and the fitted corresponding function is the quadratic function corresponding to the lower bound condition of the conditional equation. Additionally, the coefficients of 15, −0.1 and 0.00018 correspond to the second coefficient information.

Figure 4:
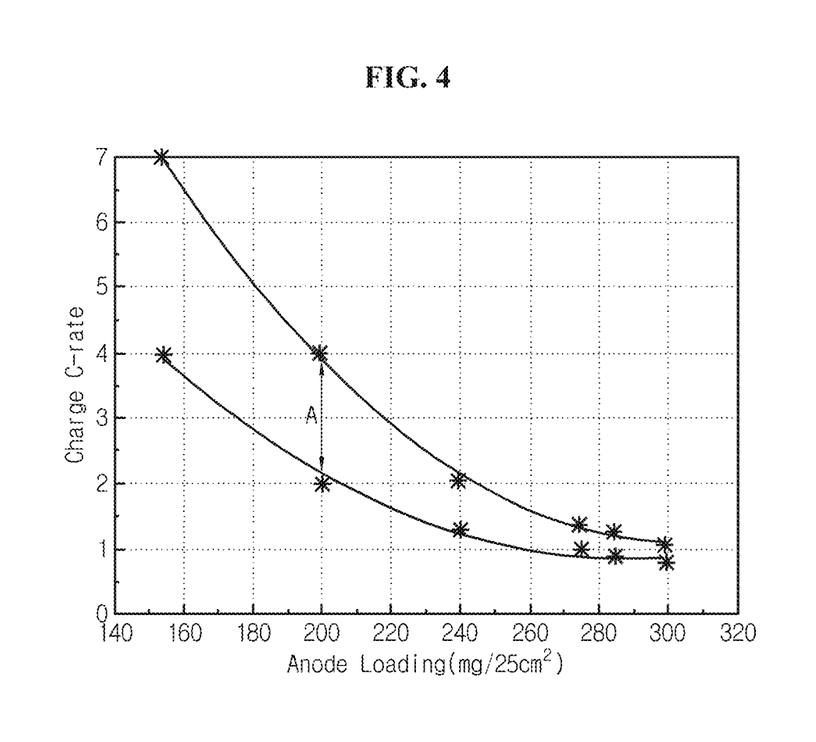
FIG. 4 is a graph showing the upper and lower bound conditions for the C-rate of the charge current according to a negative electrode loading amount, together with the quadratic functions obtained in FIGS. 2 and 3.

FIG. 4 shows a graph of the quadratic function corresponding to the upper bound condition and a graph of the quadratic function corresponding to the lower bound condition together, calculated when the positive electrode material and the negative electrode material of the lithium secondary battery are respectively $LiCoO_2$ and artificial graphite.

Referring to FIG. 4, when the negative electrode porosity of the lithium secondary battery is designed between 25 and 35%, the determination of the C-rate range of the charge current applied to the lithium secondary battery may rely on the negative electrode loading amount.

For example, when a loading amount of artificial graphite included in the negative electrode of the lithium secondary battery is 200 mg/25 cm$^2$ and the negative electrode porosity is 25 to 35%, the lithium secondary battery may be charged rapidly by adjust the C-rate of the charge current within section A indicated by the arrow, namely, between the C-rate ranges 2 and 4. Additionally, according to the present disclosure, the C-rate range of the charge current corresponding to most of the negative electrode loading amount is 1 C-rate or more. Accordingly, when only the negative electrode loading amount of the lithium secondary battery is determined, the lithium secondary battery may be charged rapidly within the range between the upper bound condition and the lower bound condition shown in FIG. 4.

Additionally, the quadratic functions corresponding to the upper bound condition and the lower bound condition are determined by evaluating the life performance of the lithium secondary battery. Accordingly, when the lithium secondary battery is designed such that the C-rate of the charge current satisfies the above conditional equation, the life performance of the lithium secondary battery is guaranteed, and the charge current C-rate range of the lithium secondary battery may be automatically determined according to the negative electrode loading amount.

Additionally, when the upper bound condition and the lower bound condition of the relationship between the negative electrode loading amount of the lithium secondary battery and the C-rate of the charge current are determined beforehand, it is possible to easily manufacture batteries having an appropriate level of energy density and fast charging performance without actually manufacturing batteries.

Meanwhile, in the above conditional equation, the first coefficient information and the second coefficient information may change depending on the type of the positive electrode material and the negative electrode material included in the lithium secondary battery.

However, even though the type of the positive electrode material and the negative electrode material changes, the calculation principle of the first coefficient information and the second coefficient information of the quadratic functions corresponding to the upper bound condition and the lower bound condition is substantially the same as the above description.

That is, after manufacturing a plurality of sample batteries with varying negative electrode loading amounts and negative electrode porosities (see Table 1), the life performance is evaluated by repeatedly performing charge cycle tests under the C-rate condition set for each example. Additionally, examples having the lowest porosity are selected from examples having failed the life performance. Additionally, the negative electrode loading amount and the C-rate of the selected examples are represented by the coordinates and fitted to a quadratic function to calculate first coefficient information of the quadratic function corresponding to the upper bound condition. Additionally, examples corresponding to the porosity of 25% are selected from examples evaluated as having succeeded in the life performance evaluation. Additionally, the negative electrode loading amount and the C-rate of the selected examples are represented by the coordinates and fitted to a quadratic function to calculate second coefficient information of the quadratic function corresponding to the lower bound condition.

Hereinafter, a quick battery charging system including the lithium secondary battery having the negative electrode loading amount and the porosity designed according to the present disclosure and the charging control apparatus will be described based on the above-described description.

Figure 5:
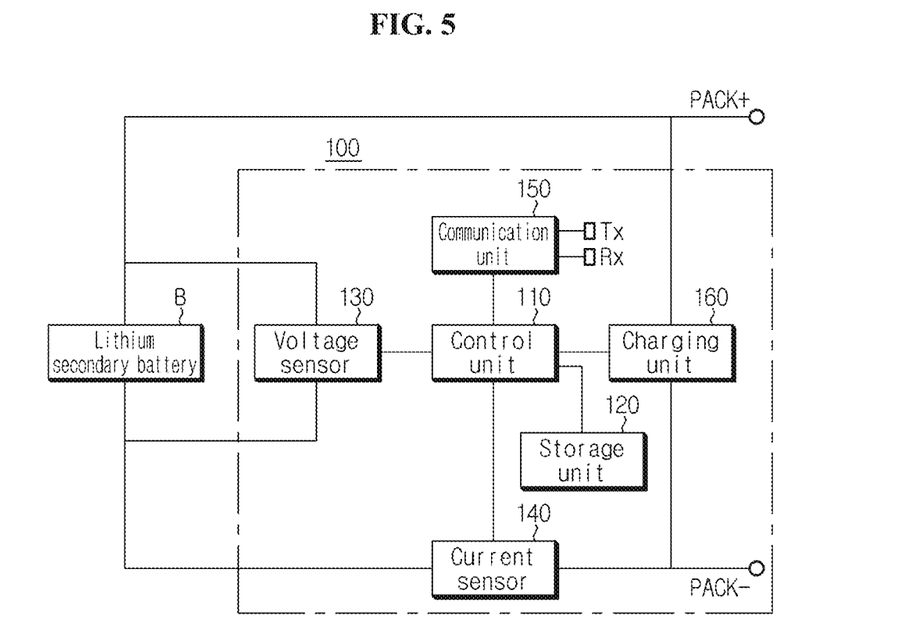
FIG. 5 is a schematic block diagram of the architecture of a quick battery charging system according to an embodiment of the present disclosure.

FIG. 5 is a schematic block diagram showing the architecture of the battery system according to the present disclosure.

Referring to FIG. 5, the quick battery charging system according to an embodiment of the present disclosure includes a lithium secondary battery B and a charging control apparatus 100.

The lithium secondary battery B includes lithium metal oxide (e.g., $LiCoO_2$) and graphite as a positive electrode material and a negative electrode material. The graphite may be artificial graphite, natural graphite or their mixtures. Additionally, the lithium secondary battery B includes a non-aqueous electrolyte as an electrolyte, and the viscosity of the electrolyte may be 2 to 5 cP, and the concentration of lithium salt may be 0.8 to 1.4M.

Preferably, the C-rate of the charge current supplied to the lithium secondary battery B from the charging control apparatus 100 and the negative electrode loading amount of the lithium secondary battery B are selected to satisfy the following conditional equation.

$$c_1-b_1x+a_1x^2<y<c_2-b_2x+a_2x^2 \quad \text{[Conditional equation]}$$

In the above conditional equation, $c_2>c_1$, $b_2>b_1$ and $a_2>a_1$.

Additionally, preferably, the negative electrode porosity of the lithium secondary battery B is 25 to 35%.

In an embodiment, when the negative electrode loading amount of the lithium secondary battery B has a value of $x_0$, the charging control apparatus 100 may perform control such that the C-rate (y) of the charge current applied to the lithium secondary battery B satisfies the following Range 1. That is, the magnitude of the charge current is adjusted such that the C-rate does not exceed $c_2-b_2x_0+a_2x_0^2$.

$$y<c_2-b_2x_0+a_2x_0^2 \quad \text{[Range 1]}$$

In another embodiment, when the negative electrode loading amount of the lithium secondary battery B has a value of $x_0$, the charging control apparatus 100 may perform control such that the C-rate (y) of the charge current applied to the lithium secondary battery B satisfies the following Range 2. That is, the C-rate of the charge current is adjusted such that it is more than $c_1-b_1x_0+a_1x_0^2$ and less than $c_2-b_2x_0+a_2x_0^2$.

$$c_1-b_1x_0+a_1x_0^2<y<c_2-b_2x_0+a_2x_0^2 \quad \text{[Range 2]}$$

In the above Range 1 and 2, the coefficients $a_1$, $a_2$, $b_1$, $b_2$, $c_1$ and $c_2$ may change depending on the type of the positive electrode material and the negative electrode material included in the lithium secondary battery B.

For example, when the positive electrode material and the negative electrode material are $LiCoO_2$ and artificial graphite, the coefficients $a_1$, $a_2$, $b_1$, $b_2$, $c_1$ and $c_2$ may be respectively 0.00018, 0.00027, 0.1, 0.16, 15 and 26.

Preferably, the charging control apparatus 100 may include a storage unit 120 to store information associated with the type of the positive electrode material and the negative electrode material and a lookup table for mapping of the coefficients according to the type of the positive electrode material and the negative electrode material to change the coefficients (first coefficient and second coefficient) according to the type of the positive electrode material and the negative electrode material.

Here, the storage unit 120 may be RAM, ROM, register or flash memory, and the present disclosure is not limited thereto.

Additionally, the storage unit 120 may further include information associated with the negative electrode loading amount of the lithium secondary battery B. Accordingly, when charging of the lithium secondary battery B starts, the charging control apparatus 100 may read the negative electrode loading amount information stored in the storage unit 120 and determine and apply the C-rate range of the charge current supplied to the lithium secondary battery B within the above-described range.

Preferably, the charging control apparatus 100 includes a control unit 110; a charging unit 160; and a communication unit 150.

The control unit 110 generally controls the charging unit 160 and the communication unit 150. The control unit 110 may receive information associated with the type of the positive electrode material and the negative electrode material included in the lithium secondary battery B and/or the negative electrode loading amount and/or the negative electrode porosity from an external device through the communication unit 150.

The communication unit 160 is a sort of communication interface, and refers to a CNN communication interface or a Daisy chain interface or a known wireless communication interface or a RS-232 interface.

The external device may be a control computer of a load device (for example, an electric vehicle or a hybrid vehicle) where the battery system is mounted. In another example, the external device may be a station computer that installs an operating program on the control unit of the battery system in the process of manufacturing the battery system. The control computer or the station computer transmits the information associated with the type of the positive electrode material and the negative electrode material included in the lithium secondary battery B and/or the negative electrode loading amount and/or the negative electrode porosity to the control unit 110 through the communication unit 150 as per the request from the operator.

When the control unit 110 receives the information associated with the type of the positive electrode material and the negative electrode material included in the lithium secondary battery B and/or the negative electrode loading amount and/or the negative electrode porosity through the communication unit 150, the control unit 110 records and keeps the corresponding information in the storage unit 120.

The control unit 110 generally controls the charge of the lithium secondary battery B. That is, the control unit 110 monitors the state of charge of the lithium secondary battery B. To this end, the quick battery charging system according to the present disclosure includes a voltage sensor 130 and a current sensor 140.

The voltage sensor 130 measures the voltage of the lithium secondary battery B, and outputs a voltage measurement signal equivalent to the measured voltage magnitude to the control unit 110. Then, the control unit 110 determines a voltage value of the lithium secondary battery B from the voltage measurement signal, and stores it in the storage unit 120. The voltage sensor 130 includes a voltage measurement circuit, for example, a differential amplifier circuit to measure the voltage between the positive electrode and the negative electrode of the lithium secondary battery B, and the present disclosure is not limited thereto.

The current sensor 140 measures the magnitude of the charge current or the discharge current of the lithium secondary battery B, and outputs a current measurement signal equivalent to the measured magnitude of the current to the control unit 110. Then, the control unit 110 determines a charge current value or a discharge current value of the lithium secondary battery B from the current measurement signal, and stores it in the storage unit 120. The current sensor 140 may be a hall sensor or a sense resistor, and the present disclosure is not limited thereto.

The control unit 110 may determine whether to start charging the lithium secondary battery B using the measured voltage value or the measured current value stored in the storage unit 120.

In an example, when the voltage value of the lithium secondary battery B corresponds to the full discharge voltage, the control unit 110 may determine that it is necessary to start charging the lithium secondary battery B.

In another example, the control unit 110 may calculate the parameter, State of Charge (SOC) by integrating the charge current value or the discharge current value of the lithium secondary battery B over time, and when the SOC corresponds to 0%, the control unit 110 may determine that it is necessary to start charging the lithium secondary battery B.

Considering safety problem, it is obvious to those skilled in the art that the control unit 110 may determine whether to start charging at the early stage by allocating a predetermined margin on the basis of the full discharge voltage or SOC 0%.

In addition to the foregoing, various modifications may be made to the method of determine whether to start charging by the control unit 110. Accordingly, the present disclosure should be interpreted as being not limited to a particular method of determining whether to start charging.

When the control unit 110 determines to start charging, the control unit 110 identifies the type of the positive electrode material and the negative electrode material included in the lithium secondary battery B by referring to the storage unit 120, and maps the first coefficient information $a_2$, $b_2$, $c_2$ and the second coefficient information $a_1$, $b_1$, $c_1$ corresponding to the type of the positive electrode material and the negative electrode material identified by referring to the lookup table.

In a specific example, when the positive electrode material and the negative electrode material are respectively $LiCoO_2$ and graphite, the $a_1$, $a_2$, $b_1$, $b_2$, $c_1$ and $c_2$ may be respectively determined to be 0.00018, 0.00027, 0.1, 0.16, 15 and 26.

Subsequently, the control unit 110 identifies the negative electrode loading amount (e.g., $x_0$) of the lithium secondary battery by referring to the storage unit 120 and determines range information associated with the C-rate (y) of the charge current to be applied to the lithium secondary battery B.

In an example, the above range may be determined by the following condition.

$$y < c_2 - b_2 x_0 + a_2 x_0^2 \qquad \text{[Range 1]}$$

In another example, the above range may be determined by the following condition.

$$c_1 - b_1 x_0 + a_1 x_0^2 < y < c_2 - b_2 x_0 + a_2 x_0^2 \qquad \text{[Range 2]}$$

Subsequently, the control unit 110 may adjust the C-rate (y) of the charge current according to the above Range 1 or 2 and apply it to the lithium secondary battery B.

Preferably, the control unit 110 may adjust the C-rate of the charge current close to the above Range 1 or 2 by controlling the charging unit 160.

The control unit 110 may monitor the state of charge of the lithium secondary battery B by receiving inputs of voltage measurement signals and/or current measurement signals from the voltage sensor 130 and/or the current sensor 140 while charging.

When the voltage of the lithium secondary battery B is close to the upper charge voltage with a predefined margin or the SOC of the lithium secondary battery B is close to SOC 100% with a predefined margin, the control unit 110 reduces the C-rate of the charge current by controlling the charging unit 160, and preferably, the control unit 110 may reduce the C-rate of the charge current close to the lower bound condition of the Range 2.

The charging unit 160 supplies the charge current to the lithium secondary battery B according to the C-rate determined by the control unit 110 under the control of the control unit 110. The charging unit 160 includes a DC/DC converter, a DC/AC converter and an inverter. Technology related to the charging unit 160 capable of adjusting the C-rate is widely known in the technical field pertaining to the present disclosure, and its detailed description is omitted herein.

The control unit 110 adjusts the C-rate of the charge current supplied to the lithium secondary battery B within the Range 1 or 2 through the charging unit 160 by controlling the charging unit 160. The details of C-rate adjustment are provided above.

In the present disclosure, the control unit 110 may selectively include a processor, application-specific integrated circuit (ASIC), a chipset, a logic circuit, a register, a communication modem and a data processing device known in the art to execute the above-described various control logics. Additionally, when the control logic 110 is implemented in software, the control unit 25 may be implemented as a set of program modules. In this instance, the program module may be stored in the memory, and executed by the processor. The memory may be inside or outside of the processor, and may be connected to the processor with a variety of well-known computer components. Additionally, the memory may be included in the storage unit 120 of the present disclosure. Additionally, the memory refers collectively to devices in which information is stored irrespective of the type of the device and does not refer to a particular memory device.

Additionally, At least one of the various control logics of the control unit 110 may be combined, and the combined control logics may be written in computer-readable code system and recorded in computer-readable recording media. The recording media is not limited to a particular type and includes any type that can be accessed by a processor included in a computer. For example, the recording media includes at least one selected from the group consisting of ROM, RAM, a register, CD-ROM, a magnetic tape, a hard disk, a floppy disk and an optical data recording device. Additionally, the code system may be stored and executed in computers connected via a network in a distributed manner. Additionally, functional programs, codes and code segments for implementing the combined control logics may be readily inferred by programmers in the technical field to which the present disclosure belongs.

In the present disclosure, the lithium secondary battery may be a unit product. Additionally, the lithium secondary battery may be a module including the unit products, or batteries, connected in series and/or in parallel. Accordingly, it is obvious that the present disclosure is not limited to a physical number of lithium secondary batteries.

In describing various embodiments of the present disclosure, it should be understood that the components designated by '~ unit' are elements which are classified functionally rather than physically. Accordingly, each component may be selectively combined with other component, or each component may be divided into subcomponents for efficient execution of control logic(s). However, it is obvious to those skilled in the art that even though the components are combined or divided, if the sameness of functions may be acknowledged, the combined or divided components should be construed as being in the scope of the present disclosure.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure, the scope of the appended claims and their equivalents.

What is claimed is:

1. A quick battery charging system, comprising:
    a lithium secondary battery having a negative electrode porosity of 25 to 35% and a negative electrode loading amount of $x_0$;
    a storage unit which stores a lookup table for mapping first coefficient information of an upper bound condition associated with a C-rate of a charge current represented by a quadratic function and information associated with the negative electrode loading amount ($x_0$); and
    a charging control apparatus which reads the information associated with the negative electrode loading amount ($x_0$) from the storage unit, determines the first coefficient information of the quadratic function representing the upper bound condition from the lookup table, determines a C-rate range of the charge current using the first coefficient information, and supplies the charge current satisfying the determined C-rate range to the lithium secondary battery.

2. The quick battery charging system according to claim 1, wherein the lookup table further includes data for mapping second coefficient information of a lower bound condition associated with a C-rate of a charge current represented by a quadratic function, and the charging control apparatus is configured to read the information associated with the negative electrode loading amount ($x_0$) from the storage unit, determine the first coefficient information of the quadratic function representing the upper bound condition and the second coefficient information of the quadratic function representing the lower bound condition from the lookup table, determine the C-rate range of the charge current using the determined first coefficient information and second coefficient information, and supply the charge current satisfying the determined C-rate range to the lithium secondary battery.

3. The quick battery charging system according to claim 2, wherein the lithium secondary battery includes lithium metal oxide and graphite as a positive electrode material and a negative electrode material, and the quadratic function corresponding to the lower bound condition is $15-0.1x+0.00018x^2$.

4. The quick battery charging system according to claim 2, wherein the lookup table includes data for mapping the first coefficient information of the quadratic function corresponding to the upper bound condition and the second coefficient information of the quadratic function corresponding to the lower bound condition according to the information associated with a type of a negative electrode material and positive electrode material of the lithium secondary battery, the storage unit further includes type information associated with the positive electrode material and the negative electrode material of the lithium secondary battery, and the charging control apparatus is configured to, when charging of the lithium secondary battery starts, identify the type information associated with the positive electrode material and the negative electrode material of the lithium secondary battery from the storage unit, map the first coefficient information of the quadratic function corresponding to the upper bound condition and the second coefficient information of the quadratic function corresponding to the lower bound condition corresponding to the identified type information of the positive electrode material and the negative electrode material, determine the C-rate range of the charge current using the mapped first coefficient information and second coefficient information and the information associated with the negative electrode loading amount ($x_0$), and supply the charge current satisfying the determined C-rate range to the lithium secondary battery.

5. The quick battery charging system according to claim 1, wherein the lithium secondary battery includes lithium metal oxide and graphite as a positive electrode material and a negative electrode material, and the quadratic function corresponding to the upper bound condition is $26-0.16x+0.00027x^2$.

6. The quick battery charging system according to claim 5, wherein the positive electrode material includes $LiCoO_2$.

7. The quick battery charging system according to claim 5, wherein the graphite includes a material selected from the group consisting of artificial graphite, natural graphite and a mixture thereof.

8. The quick battery charging system according to claim 5, wherein the lithium metal oxide includes $LiCoO_2$, and the negative electrode material includes artificial graphite.

9. The quick battery charging system according to claim 1, wherein the lookup table further includes data for mapping the first coefficient information of the quadratic function corresponding to the upper bound condition according to the information associated with a type of a negative electrode material and a positive electrode material of the lithium secondary battery, the storage unit further includes type information associated with the positive electrode material and the negative electrode material of the lithium secondary battery, and the charging control apparatus is configured to, when charging of the lithium secondary battery starts, identify the type information associated with the positive electrode material and the negative electrode material of the lithium secondary battery from the storage unit, map the first coefficient information of the quadratic function corresponding to the upper bound condition corresponding to the identified type information of the positive electrode material and the negative electrode material, determine the C-rate range of the charge current using the mapped first coefficient information and the information associated with the negative electrode loading amount ($x_0$), and supply the charge current satisfying the determined C-rate range to the lithium secondary battery.

10. The quick battery charging system according to claim 1, wherein the lithium secondary battery includes an electrolyte comprising ethylenecarbonate (EC)/ethylmethylcarbonate (EMC)/dimethylcarbonate (DMC).

11. The quick battery charging system according to claim 10, wherein a volume ratio of EC:EMC:DMC is 3:3:4.

12. The quick battery charging system according to claim 11, wherein the electrolyte further comprises a lithium salt.

13. The quick battery charging system according to claim 12, wherein a concentration of the lithium salt is 0.8 to 1.4 M.

14. The quick battery charging system according to claim 1, wherein an energy density does not exceed 750 Wh/L.

15. A quick battery charging apparatus, comprising:
a lithium secondary battery having a negative electrode porosity of 25 to 35% and a negative electrode loading amount of $x_0$;
a storage unit which stores a lookup table for mapping first coefficient information of an upper bound condition associated with a C-rate of a charge current represented by a quadratic function and information associated with the negative electrode loading amount ($x_0$); and
a charging control apparatus which reads the information associated with the negative electrode loading amount ($x_0$) from the storage unit, determines the first coefficient information of the quadratic function representing the upper bound condition from the lookup table, determines a C-rate range of the charge current using the first coefficient information and second coefficient information, and supplies the charge current to the lithium secondary battery, which does not exceed $c_2-b_2x_0+a_2x_0^2$, wherein $a_2$, $b_2$, $c_2$ are coefficients of the quadratic function corresponding to the upper bound condition.

16. The quick battery charging apparatus according to claim 15, wherein the C-rate of the charge current is adjusted to more than $c_1-b_1x_0+a_1x_0^2$ and less than $c_2-b_2x_0+a_2x_0^2$ and $c_2 > c_1$, $b_2 > b_1$, and $a_2 > a_1$, wherein $a_2$, $b_2$, $c_2$ are coefficients of the quadratic function corresponding to the upper bound condition, and $a_1$, $b_1$, and $c_1$ are coefficients of the quadratic function corresponding to the lower bound condition.

17. The quick battery charging apparatus according to claim 16, wherein the coefficients $a_1$, $a_2$, $b_1$, $b_2$, $c_1$ and $c_2$ are 0.00018, 0.00027, 0.1, 0.16, 15 and 26, respectively.

18. The quick battery charging apparatus according to claim 15, wherein a positive electrode material includes lithium metal oxide.

19. The quick battery charging apparatus according to claim 15, wherein a negative electrode material includes a material selected from the group consisting of artificial graphite, natural graphite and a mixture thereof.

20. The quick battery charging apparatus according to claim 15, wherein a positive electrode material includes lithium metal oxide, and a negative electrode material includes artificial graphite.

* * * * *